United States Patent
Gonthier et al.

(10) Patent No.: US 7,933,479 B2
(45) Date of Patent: Apr. 26, 2011

(54) MULTIMODE FIBER OUTER CLADDING COUPLER FOR MULTI-CLAD FIBERS

(75) Inventors: François Gonthier, Montreal (CA); Marc Garneau, Montreal (CA); Nelson Vachon, Mascouche (CA)

(73) Assignee: ITF Laboratories Inc., Montreal, QC (CA)

( * ) Notice: Subject to any disclaimer, the term of this patent is extended or adjusted under 35 U.S.C. 154(b) by 801 days.

(21) Appl. No.: 11/672,225

(22) Filed: Feb. 7, 2007

(65) Prior Publication Data
US 2010/0183261 A1    Jul. 22, 2010

(30) Foreign Application Priority Data
Feb. 7, 2006    (CA) .................................... 2535472

(51) Int. Cl.
*G02B 6/26* (2006.01)
(52) U.S. Cl. ............ 385/43; 385/115; 385/95; 385/123; 385/126
(58) Field of Classification Search .................... 385/27, 385/28, 123, 126, 127, 128, 43, 42, 45, 31, 385/95, 96, 97, 115; 372/6, 69, 70, 72
See application file for complete search history.

(56) References Cited

U.S. PATENT DOCUMENTS

| | | | | |
|---|---|---|---|---|
| 4,330,170 A * | 5/1982 | Johnson et al. | ................. | 385/43 |
| 4,392,712 A * | 7/1983 | Ozeki | ............. | 385/43 |
| 5,864,644 A * | 1/1999 | DiGiovanni et al. | ........... | 385/43 |
| 5,999,673 A * | 12/1999 | Valentin et al. | ................. | 385/43 |
| 6,072,811 A * | 6/2000 | Fermann et al. | ................. | 372/11 |
| 6,434,302 B1 * | 8/2002 | Fidric et al. | .................... | 385/43 |
| 6,823,117 B2 * | 11/2004 | Vakili et al. | .................... | 385/43 |
| 7,046,432 B2 * | 5/2006 | Starodoumov | ........... | 359/341.32 |
| 7,277,612 B2 * | 10/2007 | Sintov | ............. | 385/43 |
| 2004/0196537 A1 * | 10/2004 | Starodoumov | ............. | 359/341.3 |
| 2005/0094952 A1 * | 5/2005 | Gonthier et al. | ............. | 385/100 |
| 2005/0207455 A1 * | 9/2005 | MacCormack et al. | ......... | 372/6 |
| 2010/0183261 A1 * | 7/2010 | Gonthier et al. | ................. | 385/43 |

* cited by examiner

*Primary Examiner* — Brian M Healy
(74) *Attorney, Agent, or Firm* — Brouillette & Partners; Francois Cartier; Robert Brouillette (57) ABSTRACT

A multimode fiber coupler has a structure in which a plurality of tapered pump fibers are coupled laterally to a multi-clad fiber, such as a double clad fiber (DCF). Such coupler is produced by first forming a plurality of tapered pump fibers and positioning them around the multi-clad fiber, thus forming a fiber bundle. Then, the fiber bundle is twisted and fused so that the input pump fibers converge towards a waist and then diverge from it. The diverging portions of the pump fibers may be removed from the structure. Also, at the waist, the structure may be cleaved and the portion with the converging pump fibers is then spliced with a multi-clad fiber which is similar or identical to the one in the middle of the bundle.

30 Claims, 6 Drawing Sheets

MULTIMODE FIBER OUTER CLADDING COUPLER FOR MULTI-CLAD FIBERS

CROSS-REFERENCE TO RELATED APPLICATIONS

The present application claims the benefits of commonly assigned Canadian Patent Application No. 2,535,472, filed on Feb. 7, 2006.

FIELD OF THE INVENTION

This invention relates to optical fiber couplers. In particular, it relates to a coupler adapted to couple multimode pump fibers into the outer guiding cladding of a multi-clad fiber, especially a double-clad fiber.

BACKGROUND OF THE INVENTION

Multimode optical fibers are used in many applications, such as communications networks, sensors systems, avionics, and medical instruments. Though the first applications were more related to communications, the multimode fibers are now part of applications where delivering optical power is the prime requirement. As lasers, diodes and laser diode bars grow in power and have improved brightness, multimode fibers are also found more often in industrial lasers applications. In particular, fiber lasers have been improved in their design and are now capable of delivering many hundreds of watts of output. High power fiber lasers are all based on double-clad fibers (DCF). In such fibers, the laser light is transmitted through to double-clad fiber core, whereas the optical power pump light is guided in the first optical cladding of the fiber. A second optical cladding creates the outer waveguide. Because the cladding is larger than the core, greater optical power can be injected in the fiber, providing more pump power to the gain core of the double-clad fiber, thus greater output power for the laser. A general description of such arrangement is found in U.S. Pat. No. 4,829,529 of Kafka. Though pump power and core light can be injected using bulk optics such as lenses, mirrors and dichroic filters, the push of commercialization and industrialization is going towards using optical fiber components to provide coupling into the double-clad fibers. These components are designed to take one or several multimode fibers that are connected to fiber pigtailed laser diodes, laser diode bars or any pump power light sources and to connect them to the cladding of the double-clad fiber.

There are two approaches to coupling pump light into the double-clad fibers. One is to inject light by the end, called end-pumping, the other manages to couple light from the side, called side-pumping.

Many patents propose devices and techniques to achieve end pumping. The simplest is to splice a single multimode fiber with a diameter and a numerical aperture (NA) smaller than that of the DCF. If multiple fibers are required, then a fiber bundle can be fused, tapered and cleaved as disclosed in U.S. Pat. No. 4,392,712 or No. 4,330,170. The tapered fiber bundle (or TFB) half is finally spliced to the DCF as described in U.S. Pat. No. 6,823,117.

Because the bundle is tapered, basic brightness conservation has to be applied between the bundle and the DCF. The tapering of the bundle increases the longitudinal angle $A_z$ of the rays in the multimode structure, but the diameter of the bundle $\phi_b$ is decreased. For the guided rays that have the largest longitudinal angle $\theta_z$, the numerical aperture of the pump fiber $NA_b$ is given by the equation:

$$n_{co} \sin \theta_z = NA_b$$

where $n^{TM}$ is the refractive index of the core of the pump fibers. The brightness conservation is thus described by the relationship:

$$\phi_b NA_b \leq \phi_{DCF} NA_{DCF}$$

where $\phi_{DCF}$ is the diameter of the DCF cladding in which the pump has to be injected and $NA_{DCF}$ is the numerical aperture of this cladding. With this relationship, multiple fiber combiners can be made, such as 7×1 (7 multimode fibers into one output fiber) or 19×1. With the proper choice of fiber diameter and numerical aperture, these couplers can converse brightness of the fiber pigtailed pump to the DCF.

However, in double-clad fiber lasers, the power in the core has to output somewhere. With these components, it is only possible to input the double-clad fiber from one end only. For lasers requiring more input fibers or especially for amplifiers, one needs to add a signal fiber in the middle of the bundle to input or output the signals. This complicates the bundle design because it puts constraints on bundle geometry as shown in U.S. Pat. No. 5,864,644 of Di Giovanni and U.S. Pat. No. 6,434,302 of Fidric. The signal fiber is then tapered and certain taper ratios must be met to reduce the splice loss between the signal fiber core in the bundle and the core of the DCF. Because of the geometry, the most common device is a (6+1)×1 combiner (6 pump fibers surrounding 1 signal fiber into the DCF). In this configuration, all the fibers in the middle of the bundle are of the same diameter. When the signal fiber is a large core fiber often few-moded, then tapering is even more restricted as is described in U.S. Patent Application Publication No. 2005/0094952 A1 of Gonthier et al. The same applies for signal fibers that are polarization maintaining fibers. In this case, because the central fiber is not a pump fiber, the loss of brightness from the pump fiber to the DCF will be approximately 15% worse.

Thus, the advantage of end-pumping resides in that the multiple pump fibers can be combined and brightness can mostly be preserved as long as all the pump ports are used. There are restrictions on structure geometries and signal fibers if a signal need-through fiber is required and there are only 2 ends to a DCF.

The second approach, namely side-pumping, can be achieved in different ways, but they are all somewhat related to the fused couplers first disclosed in U.S. Pat. No. 4,291,940 by Kawasaki et al. describing biconical tapered fiber couplers. When two or more multimode fibers are fused longitudinally and tapered, the light escapes from one fiber because the longitudinal angles of the modes increase in the down-tapering section and become coupled to the other multimode fibers. As the diameter increases again in the up-tapering output section, the longitudinal angles of the modes decrease to a value below the numerical aperture of the output fiber, creating a low-loss fiber optic component. Such simple devices can easily couple light into a DCF but they tend to produce a uniform power distribution in the multimode waveguides and thus lots of power remains in the multimode pump fibers. Such coupling can be optimized however as described in U.S. Pat. No. 6,434,295 by MacCormack et al. In a simplified coupling model, one can assume that the coupling or power distribution in a multimode fused biconical taper coupler is proportional to the relative area of the fibers fused in the coupler. Thus, coupling a pump fiber and a DCF fiber where the two fibers have the same diameter will result in a 50% coupling of the pump light. If one fabricates a coupler coupling two DCF fibers with one pump fiber of the same diameter, then 66% of the pump fiber light is transferred into the DCF fibers. Furthermore, MacCormack proposes to increase that coupling by making the coupler transversely asymmetric. If the numerical aperture of the pump fiber is smaller than the numerical aperture of the DCF fiber, then the pump fiber can be tapered proportionally to the ratio of the numerical aperture, as per the conservation of brightness rule. The coupler is then fused in this asymmetrical region where the ratio of the area is now in favour of the DCF. As an example, if the pump fiber has a numerical aperture of 0.22 and the DCF of 0.44, the pump fiber can be tapered by a factor of 2, its area is thus reduced by a factor of 4. The ratio of the area between the two fibers goes from 50%/50% in the case of a untapered pump fiber to 20%/80% for the asymmetric coupler with the tapered pump fiber, thus coupling now 80% of the pump light into the DCF. This technique unfortunately is not very efficient as per use of brightness because of the power remaining in the pump fiber and in order to get very good coupling efficiency, one requires the greatest difference in the area between the pump and the DCF and the brightness loss is also directly proportional to this ratio. Thus, the better is the coupling, the worse the brightness.

Another way of creating asymmetry in the coupling ratio is proposed in U.S. Pat. No. 4,586,784. It is also based on fusing fibers longitudinally together, but is now using a longitudinal tapering in the pump fiber that is fused to the other multimode fibers, to create a larger asymmetry in the coupling. In U.S. Pat. No. 5,999,673 there is also proposed such a taper arrangement fused to a DCF fiber, but in this case a single pump fiber is tapered to a very small diameter, by a factor much greater than 2. This causes an increase in the angle of the rays propagating in the pump fiber. However, because the taper is fused to the DCF, light starts to escape for the pump fiber into the DCF before the rays reach an angle where they would not longer be guided by the DCF. To insure this, the launch condition of the laser diode to the pump fiber is controlled so that the longitudinal angle of the rays coupled from the laser do not exceed that of the DCF, even after these rays have been through the tapered portion fused to the coupler. The relationship between the angle of the laser pigtail and the critical angle of the DCF is given as the square root of the ratio of the sum of the areas of the non-tapered pump fiber and the DCF fiber over the output DCF fiber area, which assumes that the fiber is tapered to a negligible diameter. This technique has the advantage of producing coupling efficiency close to 100%, however, its configuration does not optimize brightness. Using its relation, the relative loss of brightness is equal to the ratio of the divergence angle and the critical angle of the DCF. For two fibers of the same diameter, this gives 40% which is worse than for a (6+1)×1 combiner. Furthermore, the pump source will tend to fill the numerical aperture of the pump fiber if a moderate length of pump fiber is between the laser and the coupler, thus changing the divergence angle. of the rays in the pump fiber. This will result in loss at the output of the coupler because of the mismatch with the DCF.

Thus, the advantages of side-pumping are that the signal fibers are always there continuous, they can be cascaded one after the other to increase the amount of power coupled, and they do not suffer the geometry restriction of end-pump combiner. Its disadvantage is that they are much less efficient in brightness conservation. This has a direct impact on the length of the amplifier and on a laser cavity length because to couple a pump source of a given pigtailed pump fiber, requires a larger diameter fiber and thus longer gain fiber because the absorption of the gain media is worse as diameter grows. Furthermore, the use of a single pump fiber is limiting the flexibility of the design configuration if several pumps are required.

There is thus a need to provide an improved coupling approach to inject pump fiber optical power into a DCF fiber while optimizing both the advantages of side-pumping of a continuous DCF with the better brightness efficiency of end-pump combiners.

OBJECTS AND SUMMARY OF THE INVENTION

It is an object of this invention is to provide a coupler that couples pump fibers laterally to the outer guiding cladding of a multi-clad fiber, especially a DCF.

A further object of this invention is to improve the brightness efficiency of a side-pumping coupler.

Another object of the present invention is to provide a method for obtaining such coupler.

Other objects and advantages of the invention will be apparent from the following description thereof.

In essence, the invention provides a coupler having a structure in which a plurality of tapered pump fibers are coupled laterally to a multi-clad fiber, such as a DCF. Preferably, there is little or no tapering of the DCF, thus preserving model properties of the DCF core and minimizing loss signal. A single mode to a large core DCF can be used for the coupler of this invention and both with polarization maintaining DCF fibers and non polarization maintaining DCF fibers. The coupling is based on the numerical aperture of the pump fibers, rather than on the divergence angle of the rays injected by the pump source into the pump fiber, and normally the numerical value of the DCF is larger than the numerical value of the pump fibers.

The tapered pump fibers are longitudinally fused to the DCF and the degree of fusion of such fibers varies longitudinally, so that the downward or converging taper of the pump fibers is strongly fused to the DCF, while the upward or diverging taper of the pump fibers is barely or not fused at all. The residual pump power is thereby minimized in the output pump fibers which are not essentially fused to the DCF. Moreover, these output pump fibers may be entirely removed from the optical structure. One can also use larger fiber diameters such as 400 µm or 600 µm in the coupler of the present invention.

The method of the present invention for producing a multimode fiber outer cladding coupler essentially comprises:
(a) forming a plurality of tapered pump fibers;
(b) positioning said plurality of tapered pump fibers in a desired arrangement around a central multi-clad fiber, such as a DCF, from which the outer protective jacket has been stripped, thereby forming a fiber bundle; and
(c) twisting said fiber bundle and fusing it to form a structure in which portions of the tapered pump fibers converging towards a waist become input pump fibers and portions of the tapered fibers diverging from the waist become output pump fibers.

Preferably, the input pump fibers are strongly fused to the central multi-clad fiber, while the output pump fibers are very little fused or not fused at all to the central multi-clad fiber.

Also, the output pump fibers may be entirely removed from the structure by heating and pulling them away essentially at the waist and any segments remaining after pulling off the output pump fibers are normally reheated and fused to the multi-clad fiber.

In a second embodiment, the bundle is cleaved at the waist to form a cleaved face that has essentially the same diameter as that of the multi-clad fiber, and the part of the bundle with the input pump fibers fused on its side is spliced with an output multi-clad fiber which is similar or identical to the multi-clad fiber in the center of the bundle and which is preferably a gain fiber.

BRIEF DESCRIPTION OF THE DRAWINGS

The invention will now be described with reference to the appended drawings, in which.

DETAILED DESCRIPTION OF THE INVENTION

Figure 1:
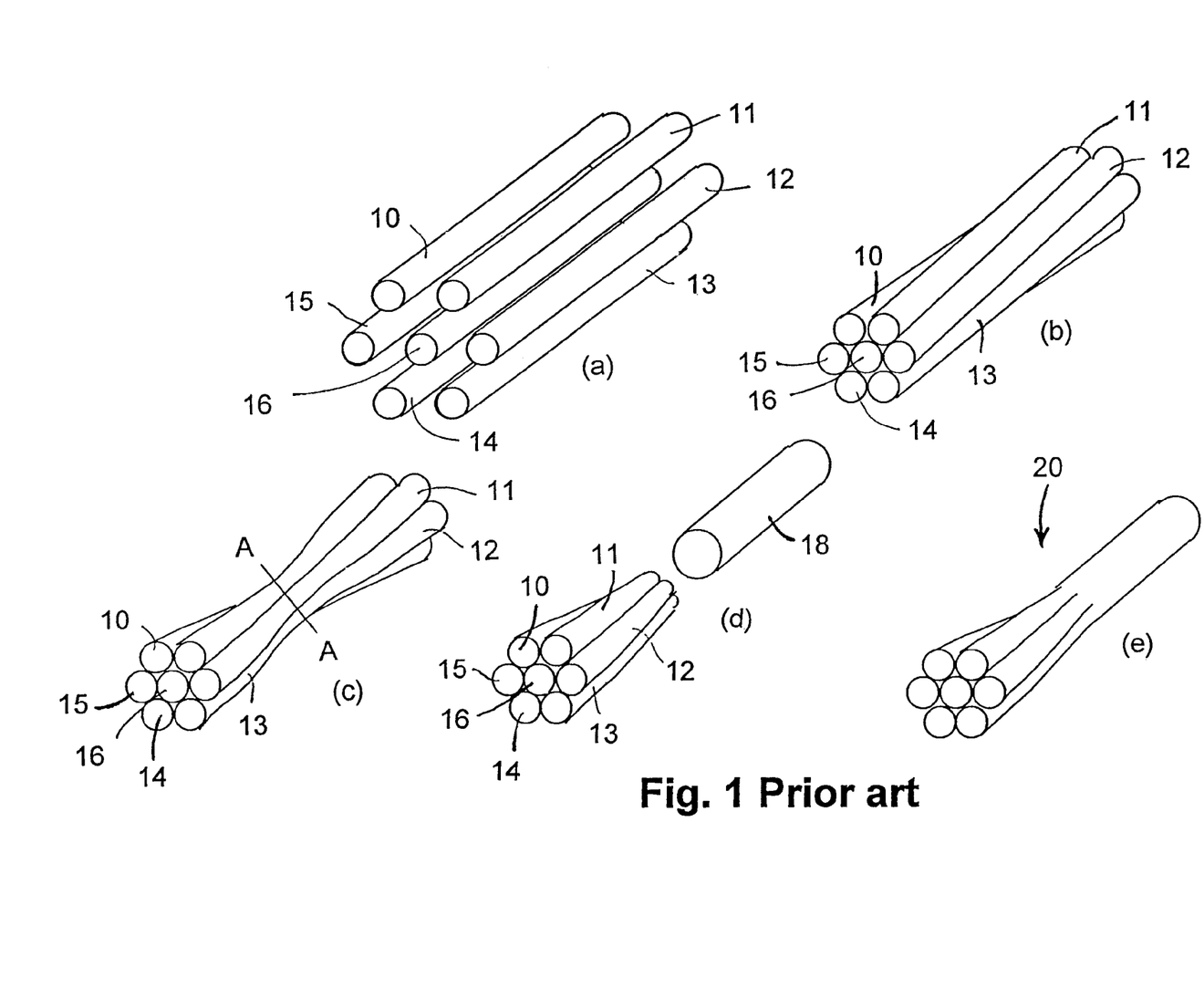
FIG. 1 is a representation, in perspective, of steps (a) to (e) illustrating a prior art fabrication of a tapered fused fiber bundle with 7 input fibers spliced to one output fiber.

In order to better understand the invention, some prior art examples are first illustrated and described. Thus, the end-pump configuration used in the prior art always requires a splice between the fiber bundle and the DCF. The technique for producing such configuration is illustrated in FIG. 1; where in step (a) six outer fibers 10, 11, 12, 13, 14 and 15 are longitudinally positioned around the central fiber 16. Then, in step (b) the outer fibers 10, 11, 12, 13, 14 and 15 are twisted around the central fiber 16 to form a fiber bundle. Thereafter, in step (c) this bundle is fused and stretched until, at its waist represented by line A-A it has a diameter of the same size as that of the DCF to which it is to be spliced. Then, it is cleaved at line A-A and its cleaved end is aligned with the end of the DCF fiber 18 as shown in step (d). Finally, as shown in step (e) of FIG. 1, the aligned end at the waist of the bundle is spliced with the end of DCF fiber 18 to form the end-pump multimode combiner 20.

Figure 2:
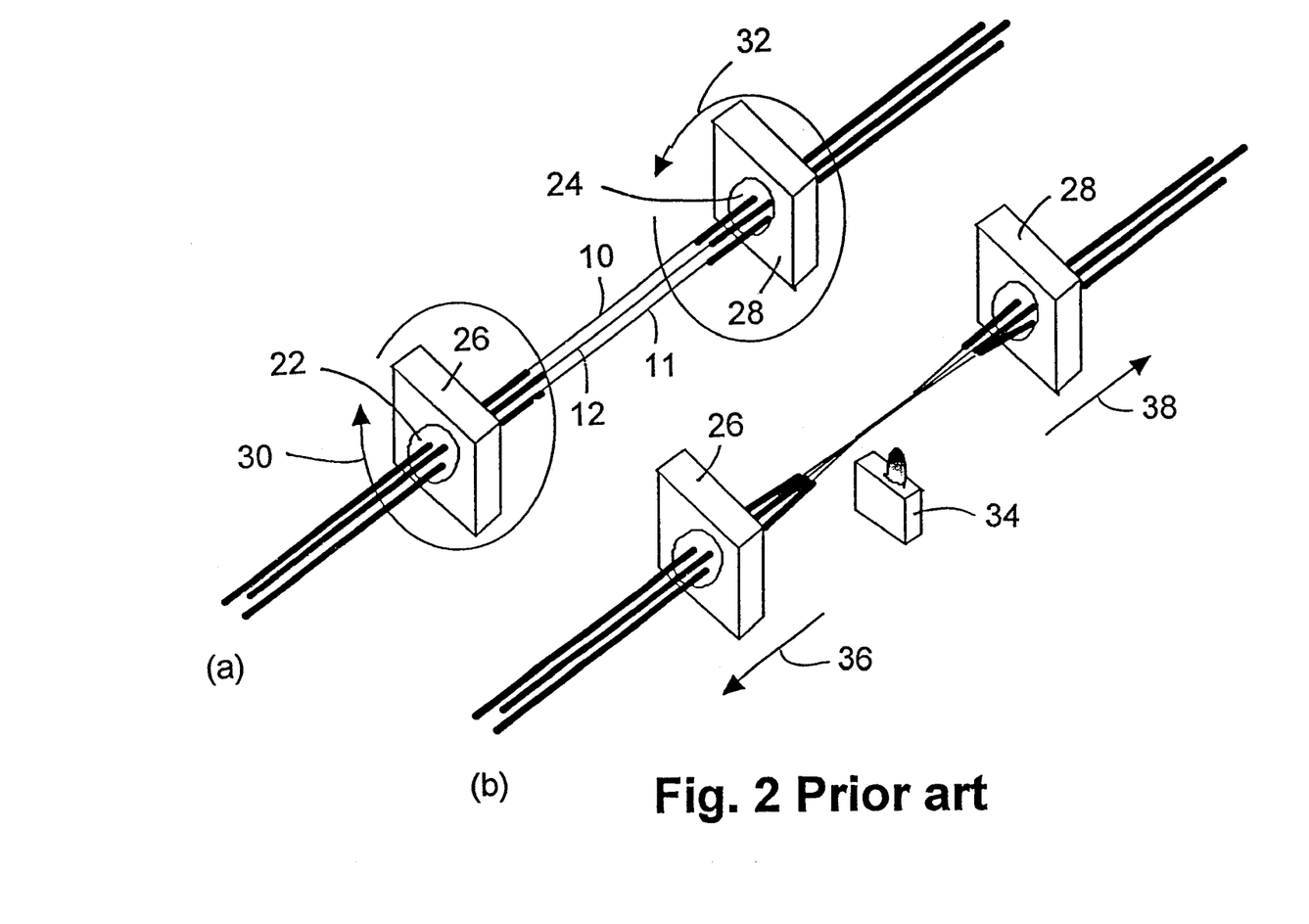
FIG. 2 is a representation, in perspective, showing stages (a) and (b) of a prior art fiber holder that may be used to align, twist, fuse and taper a fiber bundle.

To achieve steps (a), (b) and (c) shown in FIG. 1, a setup or jig such as shown in FIG. 2 may be used, which is known in the prior art. As shown in stage (a) of FIG. 2, a number of multimode fibers 10, 11, 12 are held in clamps 22 and 24 of mechanical holders 26 and 28. In FIG. 2, only three such fibers are shown for simplicity, but it is known that such setups can handle any number of fibers, for example from two to more than 60, as indicated, for example, in U.S. Pat. No. 6,823,117 of Vakili et al. Thus, in stage (a) of FIG. 2, the fibers 10, 11, 12 which, for the purposes of this description are the same as those shown in FIG. 1, are stripped of their protective jackets over a predetermined length between holders 26 and 28, and also their outer cladding or cladding may be etched with proper. acid solutions if appropriate. Etching of external claddings permits an easier coupling between the fibers, while removing such cladding does not cause loss because the guiding is insured by the glass-air interface. Thus, fibers 10, 11 and 12 are properly aligned in stage (a) of the setup of FIG. 2 and then they are twisted in a desired manner, since mechanical holders 26 and 28 are rotatable as shown by arrows 30, 32. Then, using the same setup, but as shown in stage (b) of FIG. 2, the twisted fibers 10, 11 and 12 are fused together using an appropriate heat source 34 and stretched to a desired degree since the mechanical holders 26 and 28 are laterally movable as shown by arrows 36 and 38.

Figure 3A:
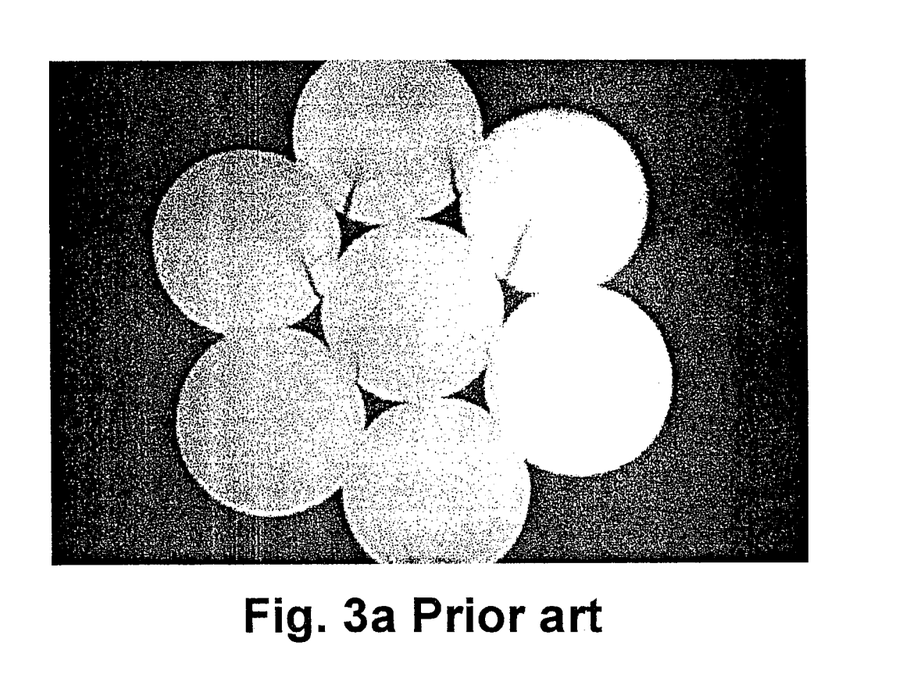
FIGS. 3a and 3b are photographs of cleaved ends of prior art fiber bundles.
Figure 3B:
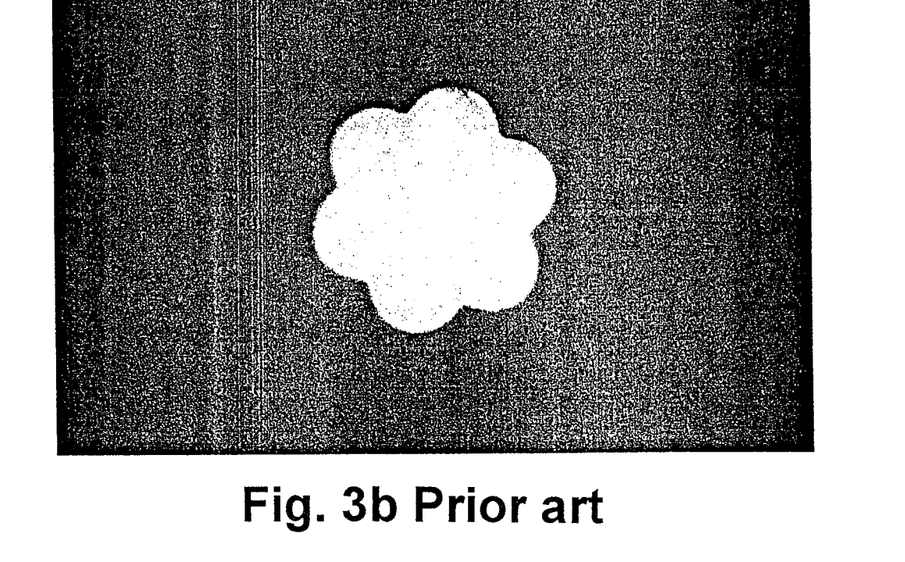

In the example illustrated in FIG. 1, the procedures described in stages (a) and (b) of FIG. 2 are used, but with seven fibers 10, 11, 12, 13, 14, 15 and 16 of equal diameter, which are properly aligned as shown in step (a) of FIG. 1, then twisted together in a tightly packing hexagonal arrangement, as shown in step (b) of FIG. 1. Although such tightly packed arrangement is not essential for multimode combiners, it is highly desirable since it provides a very stable structure for the fusing process, which is of importance, particularly for a bundle with feed-through signal fibers. Once twisted as shown in step (b) of FIG. 1, the fibers may be secured with adhesive at both ends of the twisted structure. This is to ensure that stability is maintained during the next step comprising the fusion process, which is normally achieved with a heat source that may be an oxy-propane micro flame, a $CO_2$ laser or a micro-oven. To prevent excessive stress and deformation, a wide heat source should be used and with a flame this may be achieved by brushing the flame over the fusion area. During the fusion, an elongation of the structure may be needed to correct deformations and to ensure better fusion. During or after the fusion and/or elongation, the fiber bundle is tapered as shown in step (c) of FIG. 1, so that its waist matches the size of the cladding waveguide of the output fiber as shown in step (d) of FIG. 1. For example, if the multimode input fibers are 125 µm in diameter, 7 such fibers will form a 375 µm diameter bundle. Then, if the output fiber is again 125 µm, such as a 125 µm low-index polymer coated fiber, the bundle must be fused and tapered so that its waist is reduced from 375 µm to 125 µm. The bundle is then cleaved in the middle, at line A-A of step (c) of FIG. 1, using for example a carbide blade while applying tension or bend stress at the cleavage point. FIG. 3a is a photograph of the end face of the bundle just prior to tapering, and FIG. 3b is a photograph of the same bundle cleaved at the waist after fusing and tapering. Then, one of the half-bundles is removed and replaced by the output fiber, while the other half is aligned with the end face of the output fiber as shown in step (d) of FIG. 1, and the two end faces are spliced, forming a combiner shown in step (e) of FIG. 1. The splicing is done with a suitable heat source which may be the same as used in the fusion process. Apart from any loss due to experimental defects, this bundle is low-loss if the brightness rule discussed above is respected. In the example above, if the NA of the output fiber is 0.45, because of the tapering factor of 3, the NA of the input fibers should be below 0.15. One can optimize this structure by etching the cladding of the input fibers. Commonly used fibers that have 105 µm core and 125 µm cladding can be etched to 105 µm. The diameter of the bundle is then 315 µm instead of 375 µm, and the required tapering factor is then 2.5. The NA of the input fibers can thus go up to 0.18 before loss occurs because of brightness.

Figure 4:
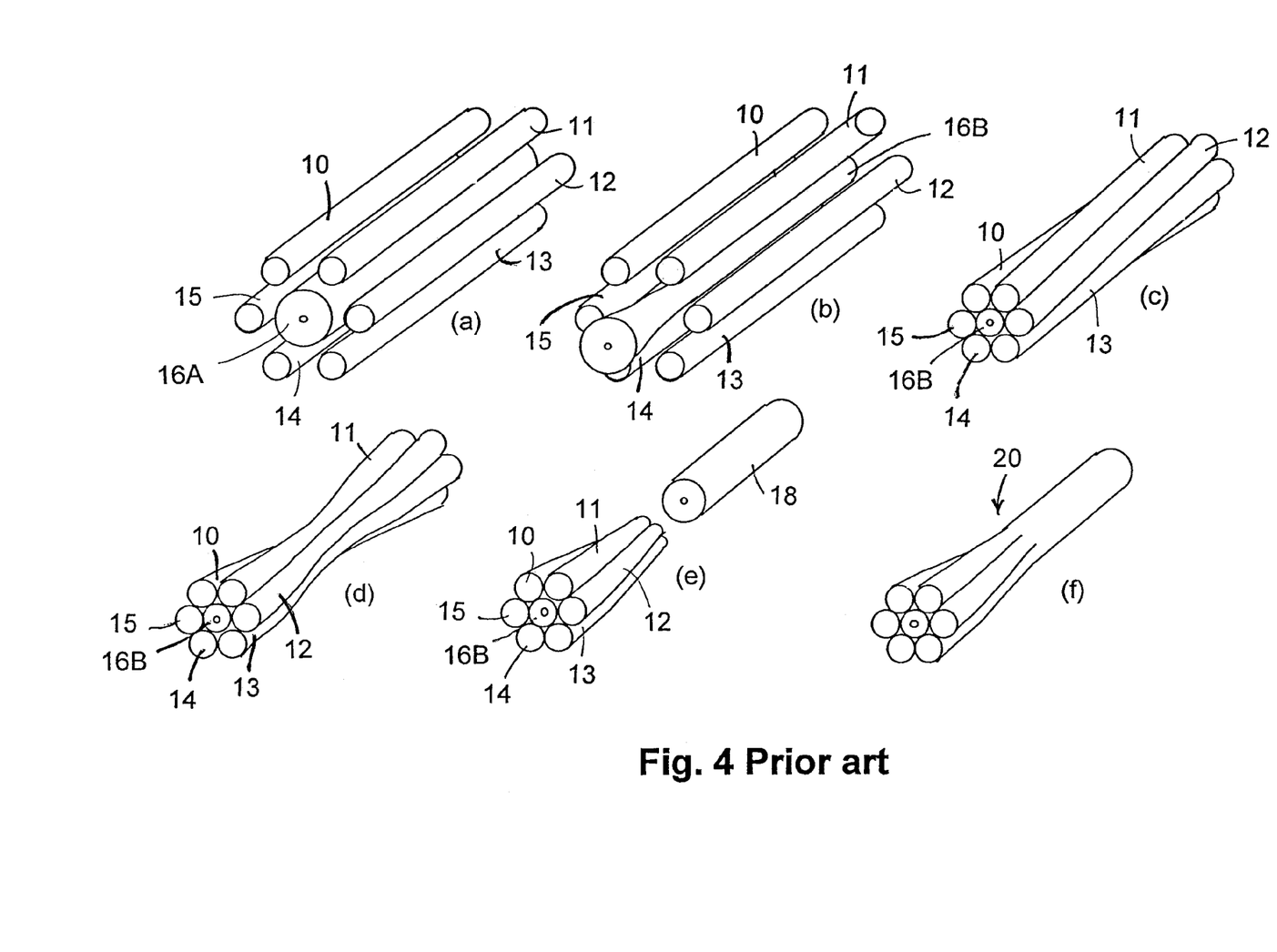
FIG. 4 is a representation, in perspective, of steps (a) to (f) illustrating another prior art fabrication of tapered fused fiber bundle having a signal fiber in its centre spliced to one output DCF.

The process described above with reference to FIG. 1 and FIG. 2 may be adapted to an arrangement that has a feed-through signal fiber. This requires that such signal fiber be placed in the middle of a bundle and imposes some symmetry to the arrangement. In such a case, the double clad signal fiber size may match the pump fiber size, but other sizes are also often seen such as having 105 µm core/125 gm cladding pump fibers and 25 µm core/250 µm cladding DCF or 200 µm core/22 µm cladding pump fibers and 20 µm core/400 µm cladding DCF. In such a case, either a special feed-through signal fiber must be designed to be of the same size as. the pump fibers or, as shown in FIG. 4, the larger signal fiber 16A shown in the middle of the arrangement in step (a) of FIG. 4 is resized by etching and/or tapering to become fiber 16B that has the same size as the surrounding pump fibers 10, 11, 12, 13, 14 and 15 as shown in step (b) of FIG. 4. Then, the remaining steps (c) to (f) of FIG. 4 are essentially the same as steps (b) to (e) of FIG. 1, except that the central pump fiber 16 is replaced by the signal fiber 16B. It should be noted, however, that to preserve the transmission of the gain fiber, the fusion carried out in step (c) of FIG. 4 must be small so as to preserve modal shape in the signal core, thus creating loss. The fiber bundle is then tapered to the DCF cladding diameter as shown in step (d) of FIG. 4. Then, after precisely aligning the core of the bundle with the core of the DCF as illustrated in step (e) of FIG. 4, the two are spliced to form a combiner structure 20 shown in step (f) of FIG. 4. To reduce the loss in such a known system, the core may be preprocessed by diffusion and tapering or etching of the feed-through signal fiber as disclosed in U.S. Patent Application Publication No. 2005/0094952 A1 belonging to the present applicant. This, however, usually requires several delicate steps in the design and fabrication, since any imperfection will cause loss, particularly with low numerical aperture, large core or polarization maintaining fibers. Thus, the bundle and splice approach causes a variety of problems, particularly when a feed-through signal fiber is to be inserted in the bundle, fused and possibly tapered and then spliced to the core of the DCF. In addition to the loss problems mentioned above, fusing the bundle produces stress in the signal fiber, and to minimize such stress, a symmetric bundle is needed. Moreover, the mode field from the output of the bundle signal fiber must match the mode field of the DCF. Finally, there exists a basic problem of the splice itself, because two different structures are spliced together; this problem becomes more apparent as the fiber diameters are larger, simply because they require more heat and therefore are more prone to deformation during the process. Thus, end pumping approaches are generally satisfactory for combining pumps, but may suffer problems in signal transmission cases because of fiber deformation in the bundle and in the splice and the mismatch at the splice itself.

In order to reduce or eliminate the above described problems of the prior art, the present invention proposes to facilitate the splicing by using a matching DCF fiber on both sides of the splice in the combiner, or alternatively by eliminating the splice entirely.

Figure 5:
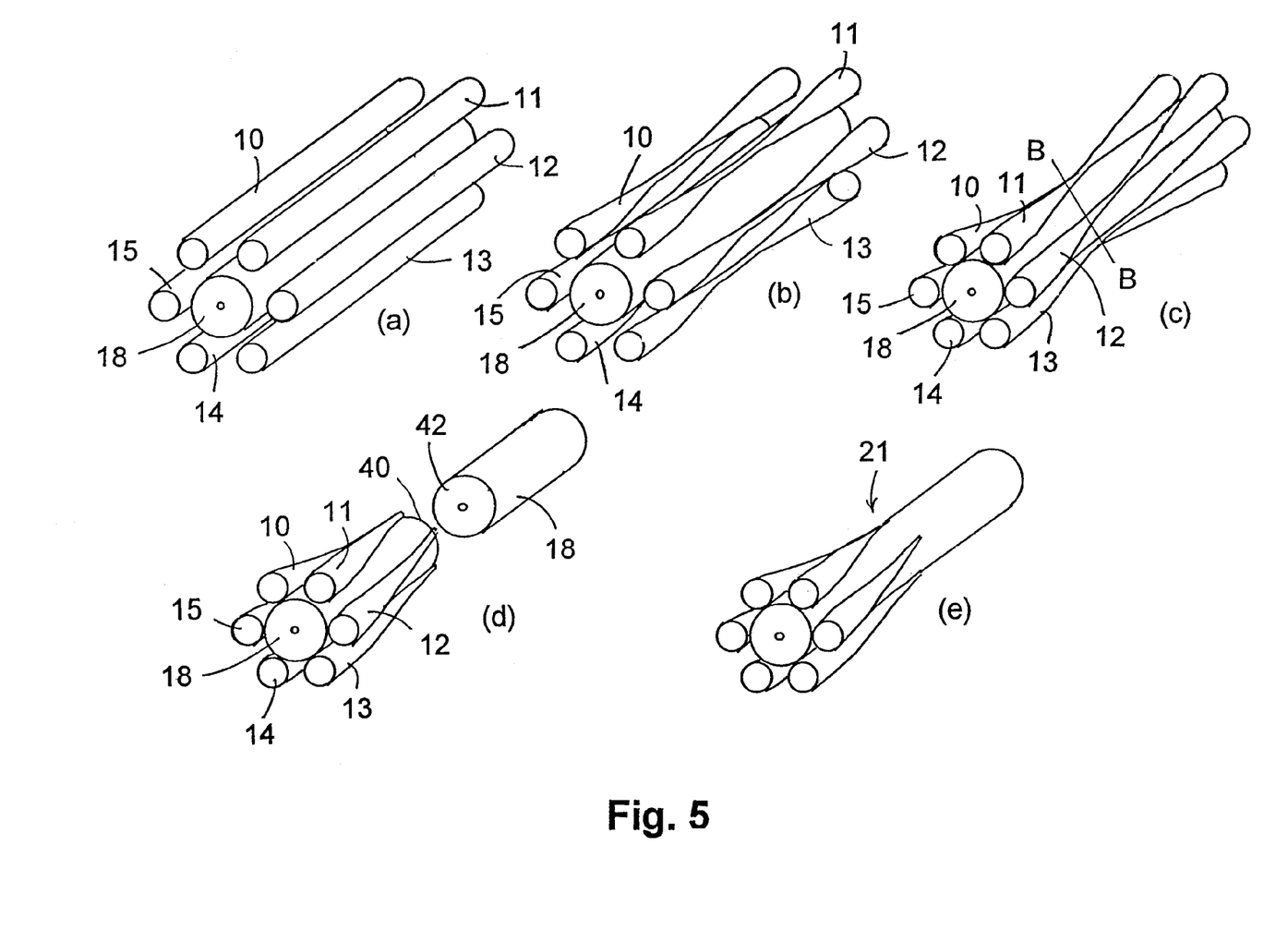
FIG. 5 is a representation, in perspective, of steps (a) to (e) illustrating the fabrication of a fiber bundle according to the present invention.

FIG. 5 illustrates the formation of the combiner according to the present invention. As shown in step (a) of FIG. 5, the initial bundle starts with the same fiber arrangement as shown in step (a) of FIG. 4, but in this case, the central signal fiber 18 is the same as the output DCF fiber 18. The surrounding pump fibers 10, 11, 12, 13, 14 and 15 in this particular example are identical to those shown in FIG. 4. In order to be able to combine this bundle with the DCF fiber, the diameter of the bundle must be reduced essentially to the diameter of the DCF fiber. In the end-pumping scheme, as illustrated in FIG. 4, first the central signal fiber 16A is reduced to a diameter of fiber 16B that is essentially the same as that of fibers 10-15. Then, after twisting and fusing, the whole bundle is tapered so that at its waist it has essentially the same diameter as that of the DCF fiber 18, after which it is cleaved at the waist and spliced with fiber 18 to form the combiner 20.

In lieu of this, according to the present invention, as shown in step (b) of FIG. 5, the central DCF fiber 18 remains unchanged because it is not desired to deform the DCF, and only the pump fibers 10, 11, 12, 13, 14 and 15 are tapered. The taper diameter of the pump fibers is made very small compared to the fiber diameter, i.e. smaller than 10%, thus producing the structure at the waist essentially equivalent to the DCF when it is twisted and fused as shown in step (c) of FIG. 5. This is realized by pre-tapering all the pump fibers and twisting and fusing them around the central DCF to create a bundle, such that at the waist of the tapered pump fibers, its diameter essentially corresponds to that of the DCF. In this arrangement, as long as the tapers are at least moderately fused to the central DCF over their length, the brightness rule for the bundle already mentioned previously applies. This means that the numerical aperture of the output DCF should be greater than the numerical aperture of the pump fibers in the proportion of the untapered bundle and the DCF. If then the bundle is cleaved along line B-B shown in step (c) of FIG. 5, which represents the smallest waist, and then the obtained cleaved face 40 is aligned with the end face 42 of an identical DCF as shown in step (d) of FIG. 5, and is spliced therewith to form a combiner 21 shown in step (e) of FIG. 5, the resulting splice is very good and there is very low loss in the signal transmission, and the pump coupling is excellent.

Figure 6:
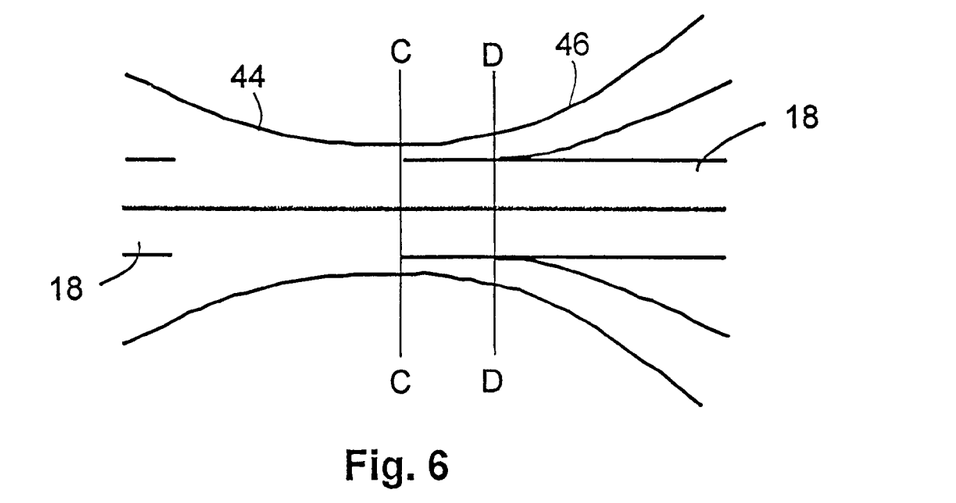
FIG. 6 is a cross-sectional side view of the asymmetric fusion profile of the tapered pump fibers to the DCF fiber produced in accordance with this invention.

Several prototypes of couplers were fabricated in this manner, with different fiber sizes, both for the DCF and for the pumps. Prototype (6+1)×1 was fabricated in two configurations. The first was using 20 µm core/400 µm cladding diameters, low-index polymer coated DCF with 0.06 numerical aperture for the core and numerical aperture of the cladding for 0.46. The pump fiber had a 200 µm core and a 220 µm diameter cladding. The pump fibers were first stripped of their respective jackets and the 10 um cladding was etched with fluoridic acid. The fibers were then cleaved and placed in. a fiber holding jig such as illustrated in FIG. 2. The fibers were placed on a hexagonal grid and the pump fibers were then tapered to 40 µm diameter. The transmission in, one of the pump fibers was monitored and showed a 10% loss after elongation. The DCF fiber was than stripped of its protective jacket before being inserted in the fiber holding jig in the central position. The 7-fiber arrangement was then twisted together. The bundle of fibers was flame brushed over its length to remove some stress due to the twist. It was then fused strongly on its input side up to the waist. During this process, the pump transmission was monitored, both in one same pump fiber and in the DCF, and the signal in the core was also monitored. At the contact in the twist, 20% of power transfer was observed between the pump fiber and the DCF. Though a uniform fusion along the length of the tapered regions would provide the proper coupling between the pumps and the DCF, it was impractical for the process because live monitoring of pump power transfer in the down taper region is not possible. Because of symmetry of the structure, some of the power coupled from the pump fibers to the DCF in the converging or down taper region of the pump fibers is coupled back into the pump fibers. Thus, there is no proper measurement of the coupled power in the DCF that would remain in the DCF. To properly measure the power transfer in the down taper, it was found that an asymmetric coupling could be realized by fusing only the down taper portion of the bundle and not fusing the diverging up-taper portion of the bundle, as shown in FIG. 6. This figure represents a longitudinal cross-sectional view of a structure such as shown in step (c) of FIG. 5 where the middle DCF fiber 18 is surrounded by tapered pump fibers of which the converging taper 44 is downwardly inclined towards the central DCF and is fused with it so that at the waist indicated by line C-C there is very little space left between the central DCF fiber and the surrounding pump fibers. Then, as the taper starts to diverge, for example after line D-D, according to this drawing, such taper 46 of the pump fibers is essentially not fused to the central DCF fiber 18 from this point on. Because the coupling depends on the degree of fusion and length of the fusion, by not fusing the output tapers, the coupling length is being made longer than the taper length, the light is almost completely coupled to the DCF in the down taper and less than 1% per fiber is coupled back in the output pump fiber.

As the fusion progressed, the pump transmission increased to more than 85%. Signal degradation started to be measurable when pump transmission was about 80%. The fusion was stopped when signal loss was 5%. The process was successfully,
reproduced for more than 20 samples. The process shows a compromise between pump coupling and signal loss. This is due to micro-bends caused by the fusion process. When longer fusion time was applied, pump coupling could reach more than 94% at the expense of having 20 to 30% loss of the signal. To minimize deformation, small elongations were performed during the fusion step, enough to keep the structure straight, but not enough to create any significant tapering (less than 10% tapering). Furthermore, it was found that the time of the fusion process should preferably be short, i.e. a few minutes, to prevent significant deformation, and thus significant loss to occur. After the fusion step, some couplers were packaged, leaving the output pump fibers as monitoring ports to measure input pump power. The resulting coupler thus functions without any cleave and splice with the output DCF. In this configuration, the coupler created is a side-coupler that does not have any cleave and splice at the output, thus giving a very good signal transmission, and with a brightness conservation efficiency which is equivalent that of an end-pump coupler. Such a coupler is shown in step (c) of FIG. 5 in which no cleave is made at line B-B and in which the end portion past the line B-B is made according to the embodiment shown in FIG. 6, namely with the upwardly tapered output pump fibers essentially not being fused to the middle DCF fiber.

The removal of the output pump fibers may however be desirable to simplify packaging and shorten the package length as well as making it possible to insert directly a gain double-clad fiber in the package, thereby saving one splice in the amplifier assembly. Such removal can, of course, be achieved as already described with reference to FIG. 5, namely by cleaving the coupler structure along line B-B, of step (c), using the same method as with a standard tapered fiber bundle, and then fusing the half-coupler to an output DCF fiber which is the same fiber as in the centre of the input structure. In such a case, a few percent of gain was observed for pump coupling, and splice loss of the core signal was also a few percent for non-polarization maintaining DCF. With polarization maintaining DCF, the splice had a detrimental effect on the polarization extinction ratio and the loss was larger.

Moreover, it is also possible to remove the output pump fibers by heating and pulling them away from the structure at the level of line D-D shown in FIG. 6 when these output fibers are not fused to the central fiber.

Figure 7:
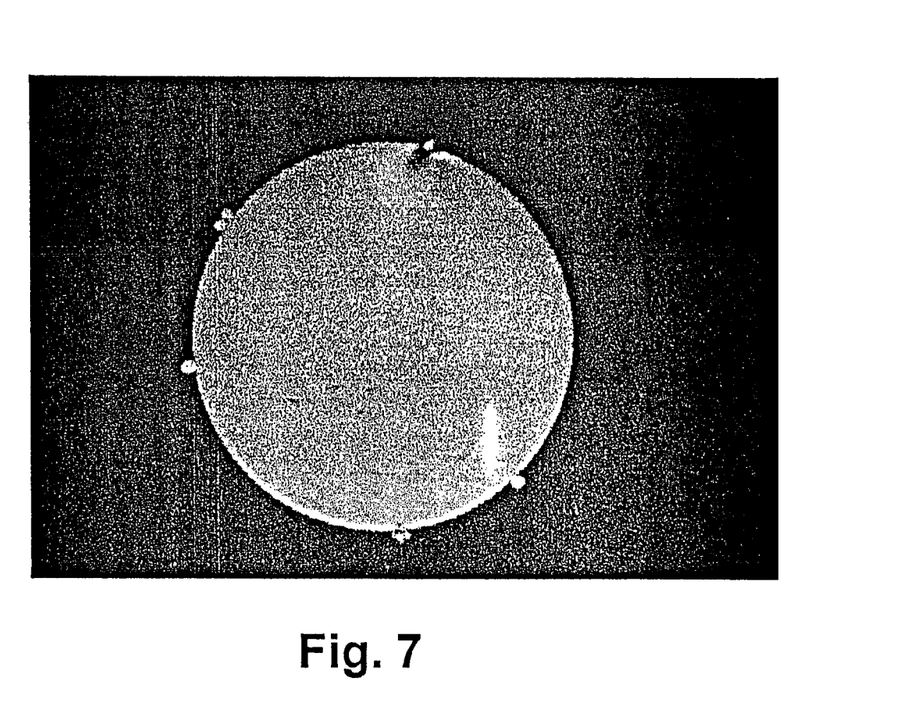
FIG. 7 is a photograph of a fiber bundle end-face cleaved at the waist of the tapered pump fibers.

The compromise between pump coupling and signal loss depends strongly on the type on fibers used. The same (6+1)×1 structure was fabricated with 25 μm core/250 μm cladding DCF fiber with the same numerical aperture as the previous DCF, i.e. 0.06 for the core and 0.46 for the cladding. In this case, the pump fibers were smaller 105 μm core/125 μm cladding. The fabrication steps were the same except with the pump fiber taper diameter which was 15 um corresponding to approximately a 50% loss in the tapered pump fiber. This could be achieved because smaller fibers are twisted with less stress than larger fibers, being more flexible. This automatically reduced the amount of power in output pump fibers thus improving the coupling. The fibers being smaller, the heat from the torch was reduced so as not to melt the fibers. In this case, pump coupling was on average more than 90% with less than 5% signal loss. This was true for both polarization maintaining and non-polarization maintaining DCF. After the fusion step, some couplers were packaged, leaving the output pump fibers as monitoring port to measure input pump power. Other couplers were cleaved, using the same process as with standard tapered fiber bundle. A photograph of such a cleave is shown in FIG. 7. It shows how small the pump fibers are with respect to the DCF. In this case, removing the pump fibers was also possible just by heating and pulling the output fiber out of the way. After such removal, the small segments of output pump fibers left on the DCF were reheated and fused to the DCF, thus smoothing the surface at the connecting points. Unfortunately, not all the pump light in the output fibers is saved because some rays do exceed the critical angle of the DCF fiber, but the overall coupling is improved. FIG. 7 shows the significant difference in fiber bundle structure between this invention and the prior art as shown in FIG. 3b.

Furthermore, FIG. 7 also shows that, even if the fibers were symmetrically placed during the twist, they have moved during fusion, fusing in a non-symmetric configuration at the waist. This does not affect the coupling of pump power and shows the placement of the fiber at the waist around the DCF is not critical. Also, some pump fibers may be removed from the structure without affecting the coupling.

Thus, whether one uses the embodiment where the fiber bundle is cleaved and spliced, or the embodiment where a longitudinally dependent fusion is used, it was surprisingly found that, as opposed to end-pumping approaches where all fibers must be in a compact arrangement to reduce non-uniform stress on the signal fiber, in the embodiments of this invention, pump fibers do not need to touch each other. One can actually remove a pump fiber, which will improve coupling efficiency because there will be less residual power in the output pump fibers. This is possible because the tapered fibers apply far less stress on the bundle as compared to full size fibers. Brightness conservation efficiency degrades because of the loss of power per port but it is greater than having a single pump fiber as provided in U.S. Pat. No. 5,999,673. Thus a (6+1)×1 configuration can easily be made into a (5+1)×1, a (3+1)×1 or a (2+1)×1. As the number of ports decrease, so is the diameter of the bundle. Thus, pump fibers can have a greater numerical aperture. In a (6+1)×1 configuration where all the fibers are of equal diameter, a factor of 3 is needed between the NA of the pumps and that of the DCF, while for a (2+1)×1, the factor is only 2. Thus a (6+1)×1 with 0.46 NA output DCF can use NA 0.15 pump fibers in the (6+1)×1 configuration and NA 0.22 pumps in a (2+1)×1 configuration. It was also found that decreasing the number of pump fibers slightly increases the coupling ratio. This is understandable because some of the light escaping one pump fiber may more readily go to another pump fiber.

On the other hand, when the DCF is of a larger diameter than the pump fiber diameter, more pump fibers can surround the DCF. For example, a 400 um diameter DCF may have nine 200 μm diameter pump fibers, thus creating a (9+1)×1 bundle. Again, if not all of the ports are to be used, they may be removed from the bundle before fabricating the bundle.

Generally, end-pumping approaches and side-pumping approaches have both advantages and disadvantages and the best choice of configuration depends greatly on the pump sources available and the DCF design. Because of brightness efficiency, end-pumping is the best choice for straight multimode fiber combining. However, when a feed-though fiber is needed for the signal, the choice greatly depends on the compromise between the efficiency of the pump coupling, brightness efficiency and signal loss. The present invention provides means of optimizing this compromise between signal loss and pump coupling and brightness efficiency.

One important point in the embodiments described above is that all the pump fibers are assumed to be fully filled with pump light, i.e., the divergence of the rays in the fiber is given by the numerical aperture of the fiber. In underfilled conditions, that is where the input laser pump light does not excite all the available angular space that can propagate in the fiber, the pump coupling efficiency of the device of this invention will function even better.

It should be noted that the invention is not limited to the specific embodiments described above, but that various modifications obvious to those skilled in the art may be made without departing from the invention and the scope of the following claims.

The invention claimed is:

1. A coupler having a structure comprising a multi-clad fiber and a plurality of tapered pump fibers, each of the tapered pump fibers comprising a converging tapered portion and a diverging tapered portion, the converging tapered portions being substantially laterally coupled to the multi-clad fiber and the diverging tapered portions being substantially not laterally coupled to the multi-clad fiber, wherein the numerical apertures of the pump fibers and of the multi-clad fiber are so adjusted as to provide a desired pump coupling and a desired brightness efficiency.

2. A coupler according to claim 1, in which the multi-clad fiber is a double clad fiber (DCF).

3. A coupler according to claim 1, in which the multi-clad fiber has a signal transmitting core selected from a single mode to a large core configuration.

4. A coupler according to claim 1, in which the numerical aperture (NA) of the multi-clad fiber is larger than the NA of the pump fibers.

5. A coupler according to claim 1, in which the converging tapered portions of the tapered pump fibers converge towards a waist on the structure, and the diverging tapered portions of the tapered pump fibers diverge away from the waist.

6. A coupler according to claim 5, in which the converging tapered portions are strongly fused to the multi-clad fiber, while the diverging tapered portions are essentially not fused to the multi-clad fiber.

7. A coupler according to claim 6, in which the diverging tapered portions are removed from the structure, leaving only the converging tapered portions fused to the multi-clad fiber.

8. A coupler according to claim 5, in which the structure is cleaved at the waist and the portion with the converging tapered portions is spliced to an output multi-clad fiber that is similar or identical to the multi-clad fiber to which the converging tapered portions are coupled.

9. A coupler according to claim 8, in which the output multi-clad fiber is a gain fiber.

10. A coupler according to claim 1, in which the multi-clad fiber is a polarization maintaining fiber.

11. A coupler according to claim 1, in which the multi-clad fiber is a non-polarization maintaining fiber.

12. A method of producing a multimode fiber outer cladding coupler which comprises:
    a) forming a plurality of tapered pump fibers, each of the tapered pump fibers comprising a converging tapered portion and a diverging tapered portion;
    b) positioning said plurality of tapered pump fibers in a desired arrangement around a central multi-clad fiber stripped of its protective jacket, thereby forming a fiber bundle; and
    c) twisting said fiber bundle and fusing it to form a structure in which the converging tapered portions, converging towards a waist, are substantially laterally coupled to the multi-clad fiber and the diverging tapered portions are substantially not laterally coupled to the multi-clad fiber.

13. Method according to claim 12, in which the converging tapered portions are strongly fused to the central multi-clad fiber, while the diverging tapered portions are very little fused or not fused at all to the central multi-clad fiber.

14. Method according to claim 13, in which the diverging tapered portions are removed from the structure by heating and pulling them away substantially at the waist.

15. Method according to claim 14, in which any segments remaining after pulling off the diverging tapered portions are reheated and fused to the central multi-clad fiber.

16. Method according to claim 12, in which the tapered pump fibers are formed with a very small taper diameter, such that the diameter of the bundle at the waist is essentially equivalent to the diameter of the multi-clad fiber.

17. Method according to claim 16, in which the taper diameter of the pump fibers at the waist is smaller than 10% of the diameter of the pump fibers.

18. Method according to claim 16, in which the bundle is cleaved at the waist and its part with side-fused converging tapered portions is spliced with an output multi-clad fiber which is similar or identical to the multi-clad fiber in the center of the bundle.

19. Method according to claim 12, comprising using as the central multi-clad fiber, a double clad fiber (DCF).

20. Method according to claim 19, in which the DCF used has a larger diameter than the diameter of the pump fibers.

21. Method according to claim 19, in which the DCF used has a numerical aperture (NA) larger than the NA of the pump fibers.

22. A coupler according to claim 5, in which the taper diameter of the pump fibers at the waist is such that the diameter of the structure at the waist is essentially equivalent to the diameter of the multi-clad fiber.

23. A coupler according to claim 22, in which the taper diameter of the pump fibers at the waist is smaller than 10% of the diameter of the pump fibers.

24. A coupler having a structure comprising a multi-clad fiber and a plurality of tapered pump fibers, wherein each of the tapered pump fibers comprises a converging tapered portion substantially laterally fused to the multi-clad fiber, and a diverging tapered portion substantially not laterally fused to the multi-clad fiber.

25. A coupler according to claim 24, in which the multi-clad fiber is a double clad fiber (DCF).

26. A coupler according to claim 24, in which the numerical aperture (NA) of the multi-clad fiber is larger than the NA of the pump fibers.

27. A coupler according to claim 24, in which the converging tapered portions of the tapered pump fibers converge towards a waist on the structure, and the diverging tapered portions of the tapered pump fibers diverge away from the waist.

28. A coupler according to claim 24, in which the diverging tapered portions are removed from the structure, leaving only the converging tapered portions fused to the multi-clad fiber.

29. A coupler according to claim 28, wherein the structure is cleaved at the waist and the portion with the converging tapered portions is spliced to an output multi-clad fiber that is similar or identical to the multi-clad fiber to which the converging tapered portions are coupled.

30. A coupler according to claim 29, in which the output multi-clad fiber is a gain fiber.

* * * * *